Figure 1:
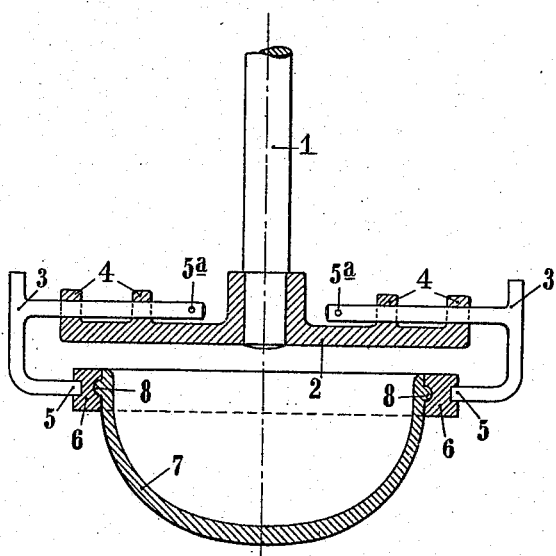

P. T. SIEVERT.
MACHINE FOR MAKING HOLLOW GLASS ARTICLES.
APPLICATION FILED APR. 24, 1909.

936,822.

Patented Oct. 12, 1909.
2 SHEETS—SHEET 1.

Witnesses:
J. Truman
H. O. Penney

Inventor:
Paul Theodor Sievert,
By his Attorney, F. H. Richards.

P. T. SIEVERT.
MACHINE FOR MAKING HOLLOW GLASS ARTICLES.
APPLICATION FILED APR. 24, 1909.

936,822.

Patented Oct. 12, 1909.
2 SHEETS—SHEET 2.

Witnesses:

Inventor:
Paul Theodor Sievert,
By his Attorney,

UNITED STATES PATENT OFFICE.

PAUL THEODOR SIEVERT, OF DRESDEN, GERMANY.

MACHINE FOR MAKING HOLLOW GLASS ARTICLES.

936,822.                  Specification of Letters Patent.        Patented Oct. 12, 1909.

Application filed April 24, 1909. Serial No. 492,001.

*To all whom it may concern:*

Be it known that I, PAUL THEODOR SIEVERT, manufacturer, a subject of the King of Saxony, German Empire, residing in Nürnbergerstr., 46, Dresden, A., Kingdom of Saxony, Germany, have invented certain new and useful Improvements in Machines for Making Hollow Glass Articles, of which the following is a specification.

My present invention relates generally to machines for making hollow glass articles and particularly to apparatus used in heating layers of glass or previously-shaped glass bodies carried by a frame attached to a carrier.

I have already shown processes of and machines for making hollow glass bodies, in which a carrying-frame holding a layer of glass or a previously-shaped glass body is connected with a head or carrier attached to a vertically-movable, preferably also revoluble, vertical shaft having an axial bore for supplying compressed air into the hollow body which is being made, as, for example in my Letters Patent 825,160 dated July 3rd 1909 and others.

According to one of such processes or by means of such machines the layers of glass or the previously-shaped glass bodies, which are first cooled as required, particularly in their central portions, are lowered into a heating-chamber or fire-drum under the shaft or blowing-pipe head, in order to bring the whole body to as uniform a temperature as possible, which operation is repeated as often as is necessary during the further treatment of the hollow body. The final shape is given to the hollow bodies by blowing them out with compressed air while they are connected by the carrying-frame with the blowing-pipe head. As in the process described in the Letters Patent 825,160 mentioned above, the hollow bodies can be blown in molds which give them the desired shape. If iron molds are used for this, it is preferable to reheat the made hollow bodies generally frequently repeatedly for a short time in the heating-chamber, in order to equalize the rapid cooling of the outer layers of glass occasioned by the iron. The frames, which according to the mentioned Letters Patent carry the glass layers or previously-shaped glass bodies, are connected with the blowing-pipe head by screws, catches or other suitable mechanical means.

When this process is carried into practice with the described machines, the blowing-pipe head and the carrying-frame must of course fit one another exactly and tightly, so that no compressed air escapes at the joint. But since the form of the carrier or carrying-frame varies according to the shape of the hollow body which is to be made, for every shape of carrier a special shape of blowing-pipe head would have to be provided, and the blowing-pipe head would have to be changed each time it was wished to change from making one definite kind of hollow vessel to another kind. This substitution is of course wasteful of time each time and necessitates a very large number of different blowing-pipe heads which is a very expensive matter. It is true that when making cylinders for table glass the drawback is not met with, because the diameters when once fixed for such cylinders are not frequently changed. But when making other hollow vessels, of which in many instances no very large number is ordered, and in which the form of the upper rims is very different, *e. g.* round, oval, angular and so on, the drawback mentioned is of great significance in practice, and a primary object of my invention is to remedy the same. Namely the subject-matter of my invention is a device which renders it unnecessary to exchange the blowing-pipe head each time. According to my invention the carriers or carrying-frames holding the glass layers are not attached to a vertically movable blowing-pipe head but to a vertically movable carrier which is provided with holding devices with the aid of which frames of quite optional shape and size can be suspended from the carriers. The carrier itself may be a perforated plate, on which the carrying-frames can be attached in optional manner. In addition mechanical means, such as catches or screws can be employed.

In order that the invention may be clearly understood I will now explain the same with reference to the accompanying drawings in which several embodiments of my device are represented by way of example.

Figure 2:
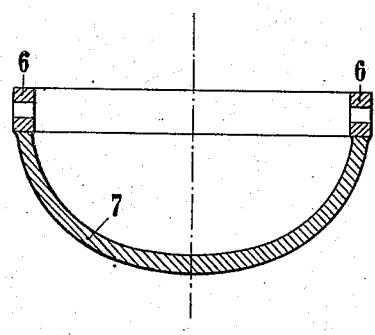
Figure 3:
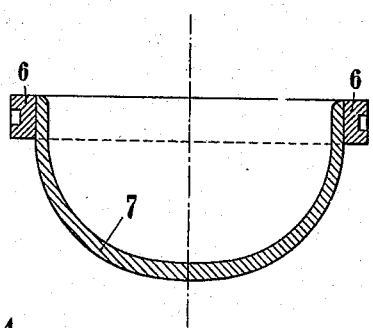
Figure 4:
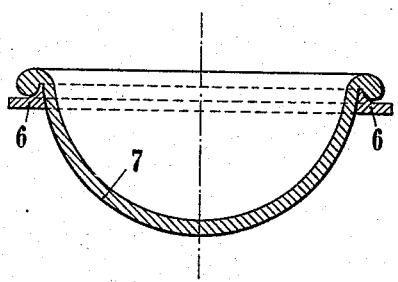
Figure 5:
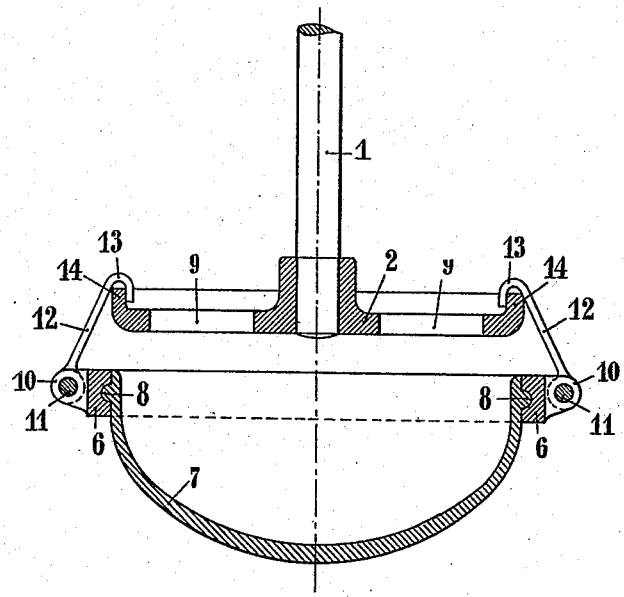
Figure 6:
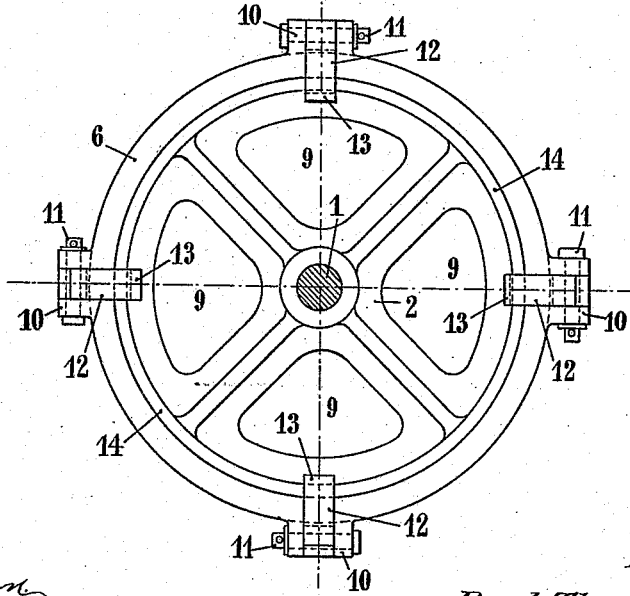

In said drawings:—Figure 1 is a vertical sectional elevation of a carrier having catches movable in guides, which catches according to their position seize or release the carrying-frame from which the layer of glass or previously-shaped glass body is suspended; Figs. 2 to 4 are like views showing carrying-frames of various shapes which may be suspended from the carrier with the aid of like catches; Figs. 5 and 6 are vertical sectional elevation, and top plan view, respectively, of a constructional form of the device, in which the catches are not attached to the carriers but to the carrying-frames and also are of somewhat modified shape.

Referring to the drawing and firstly particularly to Fig. 1, 1 designates a vertically-movable, revoluble shaft which is mounted suitably in the frame of the machine. To this shaft is fixed a cast-iron carrier 2 which is shaped like a plate but may be perforated if desired. On this plate are arranged any number, say three or four, catches 3 movable radially in guides 4. Each catch is prevented by a pin 5ª from falling off the plate. When the catches are pushed inward on the plate, their extensions 5 can enter into correspondingly shaped holes provided in a carrying-frame 6, as clearly shown. In this carrying-frame the layer of glass or previously-shaped glass body 7 is attached in known manner. According to the form shown in Fig. 1 the glass body 7 is connected with the carrying-frame 6 by a projection or collar 8 which fits a correspondingly shaped groove in the inner face of the carrying-frame, as clearly shown.

The carrying-frame may comprise one or several parts optionally and is adapted in shape to the form of the glass body which is to be made.

Referring now to Figs. 2 to 4, various possible ways are here shown in which the layer of glass or previously-shaped glass body 7 can be attached to the carrying-frame 6. According to the form shown in Fig. 2 the frame consists of a heated ring 6, to which the glass body 7 is attached by its edge in known manner. The holes in which the extensions 5 of the catches engage are clearly visible in the frames 6 in Figs. 2 and 3. According to the form shown in Fig. 3 the glass body is cast in the heated ring 6 so that it is held securely at the inner face of the ring. According to the form shown in Fig. 4 the glass body is held by the ring 6 after having been shaken on an asbestos plate in known manner. In this case the catches 5 engage under the ring 6.

In Figs. 5 and 6 a somewhat modified constructional form of the attachment of the frame 6 to the carrier 2, which here, moreover, has perforations 9, is represented. According to this form there are attached to the frame 6 by means of the hinges 10 and pins 11 hooked arms 12 having hooks 13 adapted to engage a rim 14 on the carrier 2. In this constructional form, as in that according to Fig. 1, the frame 6 can be of optionally different shape and size from the carrier 2.

It may be mentioned that to heat a previously-shaped glass body carried by a frame before it is placed in a blowing-mold for the finishing blowing and before connection to a blowing-pipe head, is known in itself. A special advantage of my improved device for heating glass layers or previously-shaped glass bodies consists in the space between carrier and frame, as illustrated in Figs. 1 and 5, being able to be made optionally large as will be readily understood. When being heated, the heat can then gain access to the upper rims and the interior of the glass sack. The perforations in the carriers and any parts attached to the carrying-frames and projecting over the carriers act in like manner. For these reasons, the glass sack is heated more rapidly and more uniformly than when the heat is applied solely to the exterior surfaces of the same.

I claim:

1. In a machine of the character described for making hollow glass articles, the combination with a vertically movable carrier, of a carrying-frame, supporting a shaped glass body, and means for suspending said frame from said carrier, said means being adjustable to permit frames of different size and shape to be suspended from the carrier.

2. In a machine of the character described for making hollow glass articles, the combination with a vertically movable perforated carrier, of a carrying-frame, supporting a shaped glass body, and means for suspending said frame from said carrier, said means being adjustable to permit frames of different size and shape to be suspended from the carrier.

3. In a machine of the character described for making hollow glass articles, the combination, with a vertically-movable carrier, of a carrying-frame, supporting a shaped glass body, and a plurality of catches adjustably mounted on said carrier and adapted to support said frame under the carrier.

4. In a machine of the character described for making hollow glass articles, the combination, with a vertically-movable carrier, of a carrying-frame, supporting a shaped glass body, and a plurality of catches pivotally attached to said frame and adapted to engage said carrier and suspend said frame therefrom.

5. In a machine of the character described for making hollow glass articles, the combination of a perforated, vertically-movable carrier, a carrying-frame, supporting a shaped glass body, and a plurality of catches adjustably mounted on said carrier and adapted to support said frame under the carrier.

6. In a machine of the character described for making hollow glass articles, the combination of a perforated, vertically-movable carrier, a carrying-frame, supporting a shaped glass body, and a plurality of catches pivotally attached to said frame and adapted to engage said carrier and suspend said frame therefrom.

In witness whereof I have hereunto set my hand this 6th day of April 1909 in the presence of the two subscribing witnesses.

PAUL THEODOR SIEVERT.

Witneses:
 ULYSSES J. BYWATER,
 CLÄRE SIMON.